(No Model.)  3 Sheets—Sheet 1.
H. H. BURDEN.
KILN FOR ROASTING ORES.
No. 357,456. Patented Feb. 8, 1887.
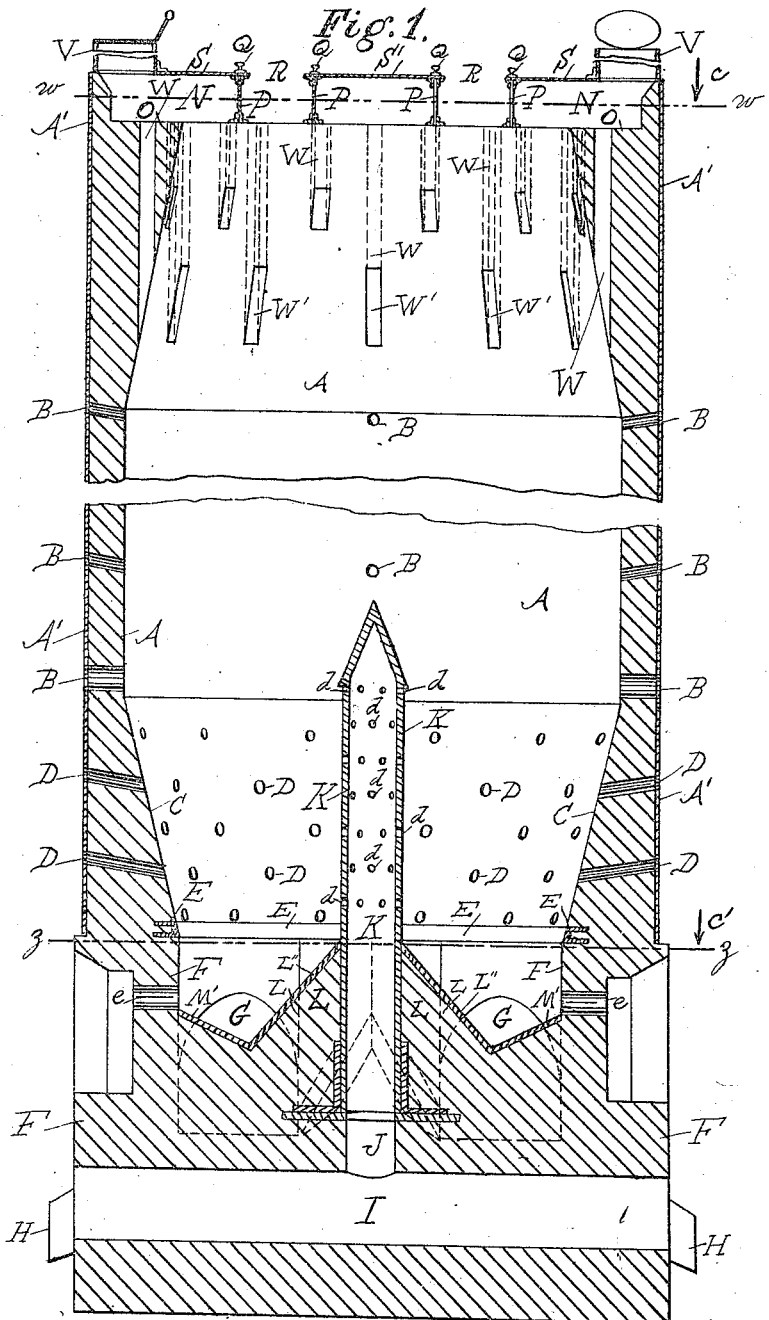
Witnesses
Fred. W. Smith.
George T. Dewey
Inventor Howard H. Burden,
per John C. Dewey,
Attorney.

(No Model.)  3 Sheets—Sheet 2.
H. H. BURDEN.
KILN FOR ROASTING ORES.
No. 357,456. Patented Feb. 8, 1887.
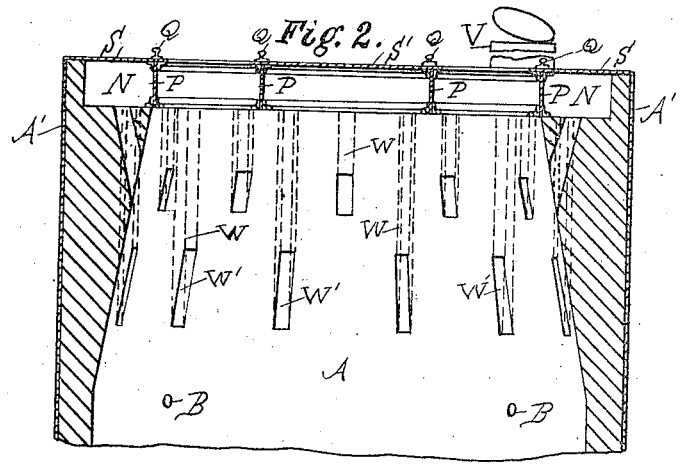
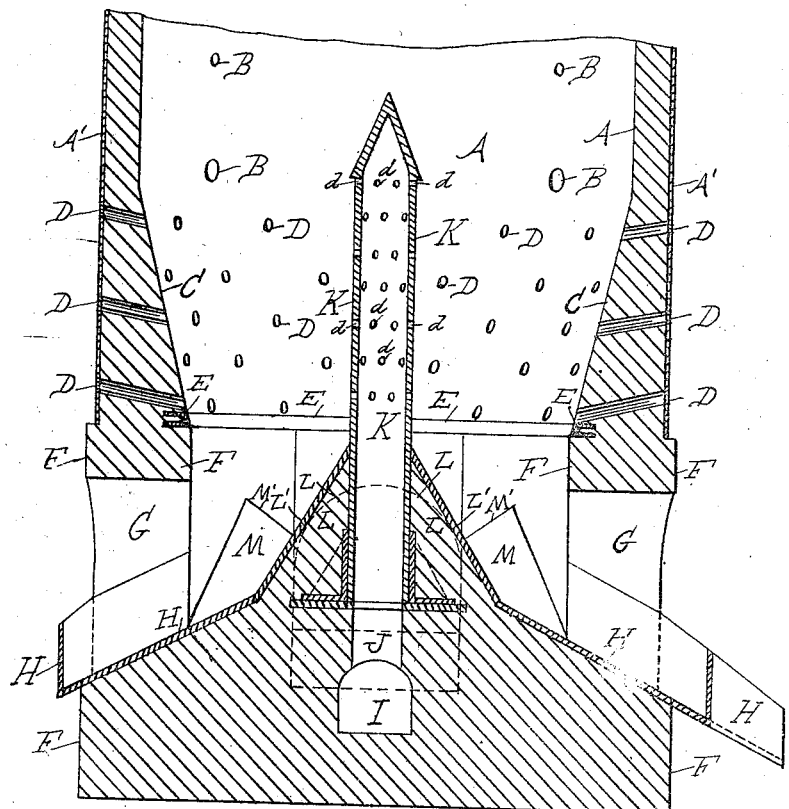
Witnesses  
Fred. W. Smith.  
George T. Dewey.
Inventor Howard H. Burden,  
per John C. Dewey,  
Attorney.

(No Model.) 3 Sheets—Sheet 3.

H. H. BURDEN.
KILN FOR ROASTING ORES.

No. 357,456. Patented Feb. 8. 1887.

Witnesses
Fred W. Smith
George T. Dewey

Inventor Howard H. Burden,
per John C. Dewey,
Attorney.

UNITED STATES PATENT OFFICE.

HOWARD H. BURDEN, OF TROY, NEW YORK.

KILN FOR ROASTING ORES.

SPECIFICATION forming part of Letters Patent No. 357,456, dated February 8, 1887.

Application filed May 5, 1886. Serial No. 201,168. (No model.)

*To all whom it may concern:*

Be it known that I, HOWARD H. BURDEN, a citizen of the United States, residing at Troy, in the county of Rensselaer and State of New York, have invented certain new and useful Improvements in Kilns for Roasting Ores; and I do hereby declare that the following is a full, clear, and exact description thereof, which, in connection with the drawings, making a part of this specification, will enable others skilled in the art to which my invention belongs to make and use the same.

My invention relates to kilns for the continuous roasting of iron or other ores; and it consists in certain novel features of construction of a kiln, for the purpose of eliminating injurious admixtures, producing a higher oxidation, and a more thorough and quicker calcination, and also a more rapid cooling of the roasted ore, thereby yielding an improved and increased product more economically.

Figure 3:
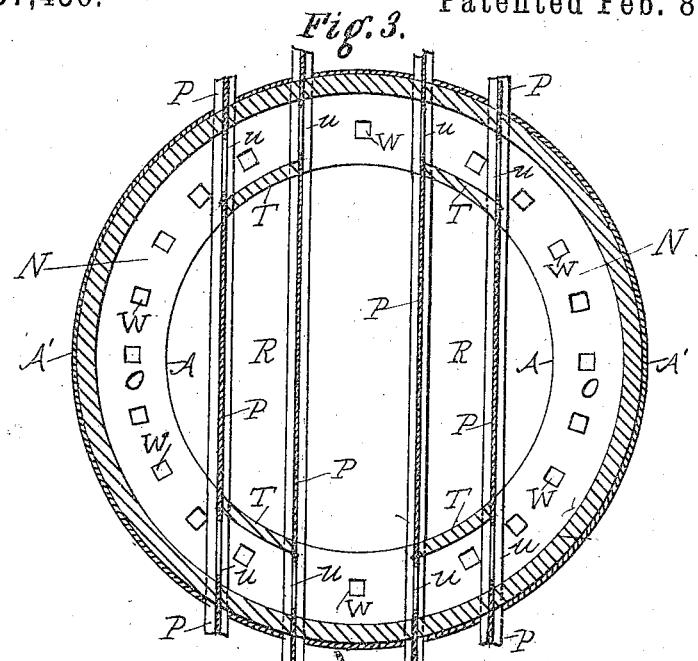
Figure 4:
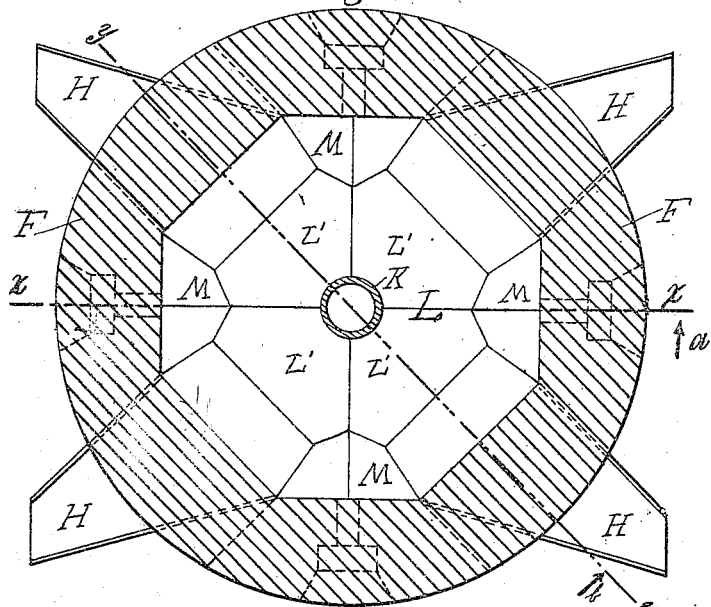

Referring to the drawings, Figure 1 represents a central vertical section through the kiln, taken on line $x$ $x$, Fig. 4, looking in the direction of arrow $a$, same figure. Fig. 2 represents a central vertical section through the kiln on line $y$ $y$, Fig. 4, looking in the direction of arrow $b$, same figure. Fig. 3 represents a horizontal cross-section on line $w$ $w$, Fig. 1, looking in the direction of arrow $c$, same figure. Fig. 4 represents a horizontal cross-section, taken on line $z$ $z$, Fig. 1, looking in the direction of arrow $c'$, same figure.

In the accompanying drawings the part marked A is the cylindrical shell of the kiln for holding the ore and fuel, which are introduced at the top of the kiln. Said shell is preferably made of fire-bricks, which are surrounded and inclosed by an iron jacket, A', through which there are in this instance four vertical rows of holes, B.

The lower part of the cylinder or shell A is provided with boshes C, sloping inward, and provided with numerous openings, D, for the purpose of admitting air.

A mantle, E, constructed of cast-iron, rests upon the substructure F of the kiln, made of masonry, and serves to support the lining of the boshes C and also prevents abrasion. The substructure of masonry F is, in this instance, circular, and has large openings G extending through the same upon four sides thereof, which are provided with metallic chutes H, extending out therefrom. Said chutes H serve for the withdrawal of the roasted ore from the kiln at the bottom thereof, and also furnish a means of penetrating the interior of the kiln, and, further, admit of a large supply of air entering the kiln at its bottom part, to increase the combustion and oxidation.

An opening or chamber, I, extends entirely through the lower part of the masonry F, and communicates at its middle point with a hole, J, extending in a vertical direction up through the center of the masonry F to the interior of the kiln. A tube, K, extends down into the hole J, and is firmly secured therein. Said tube K extends up in a vertical position in the center of the kiln, somewhat higher than the boshes C. Its top is made closed and pointed, so as to penetrate and break up any scaffold or matting together of ore as it settles down from the roasting-zone.

The tube K is provided with a number of holes or perforations, $d$, between the top and bottom thereof, for the passage of air.

By means of the opening or chamber I and the hole J in the masonry F atmospheric air is admitted through the holes $d$ in the tube K to the center of the mass of ore. It will thus be readily observed that by means of the perforated tube K, extending up into the central part of the kiln and penetrating the mass of ore, atmospheric air will be admitted to the center of the mass of ore at a point a little below the roasting-zone, thus causing a more thorough circulation of air through the center of the mass of ore, cooling the roasted product below, and producing a more intense and rapid combustion above.

The draft through the tube K may be natural, or produced by mechanical means, as desired.

Below the line of the mantel E the kiln is divided into an octagon upon its interior surface, instead of being circular. This increases the cubic capacity thereof, and allows the expansion and greater freedom of the ore as it falls below the line of the mantel, and lessens the jamming of masses and clinkers. This construction also allows the ore to move more directly and freely to the delivery-chutes.

The interior of the kiln at its base has a four-sided pyramid, L, extending up therein as high as the mantel E, through the center of which the tube K extends. Each side L′ of the pyramid slopes directly down at a sharp angle toward the openings G, through which the chutes H extend, so that the lower edge of each slope L′ will abut against the upper edge of each chute H, the chutes being but a continuation of the slopes L′, only at a less acute angle. (See Fig. 2.)

I have constructed the chutes H so that they will extend out upon the two opposite sides of the kiln, two upon each side, (see Fig. 4,) so that the ore will be conducted to the cars upon opposite sides of the kiln.

Between the openings G, within the base of the kiln, I have arranged saddles M, or two sharp sloping planes, covering each of the four sides of the octagon, which are not opened for the escape of the ore to the chutes H. The ridge or top M′ of each saddle M extends up about half of the height of the slopes L′ and slopes toward and meets the edges or intersections L″ of said slopes L′. (See Fig. 1.) At the upper point of each saddle M there is a hole, e, extending through the kiln for the purpose of permitting a bar to be thrust through to the interior of the kiln to loosen the material.

The saddles M are for the purpose of directing the ore toward the chutes and toward the plane slopes L′ of the pyramid L.

The manner of construction of the slopes L and saddles M above described is especially adapted to provide for the uniform settling of the charge by the uniform drawing of the ore.

Having thus described the manner of construction of the lower part of my improved kiln, I will now describe the manner of construction of the upper part.

The interior of the upper part of my kiln is contracted, forming the section of a cone, as shown in Figs. 1 and 2. The exterior is of the same cylindrical shape as the lower part thereof.

Upon the top of the kiln I have constructed an annular chamber, N, extending around the top thereof, the outer sides of which are formed by carrying up the iron jacket A′ with a thin lining of fire-brick some two feet above the top of the kiln proper. The bottom of the chamber N is formed by the broadened top O of the sides of the kiln proper, which are thicker at its top by reason of the interior of the kiln being of cone-like construction, as above mentioned.

Iron beams or girders P are placed across and rest upon the top of the kiln proper. In this instance I have shown four girders for supporting the rails Q of a double track which runs across the top of the kiln for conveying the loaded cars, which are dumped directly into the top of the kiln through the open spaces R between the tracks Q and the girders P.

The top of the chamber N is formed by plates S, supported upon the top of the iron jacket A′, carried up above the top of the interior of the kiln, as mentioned, and upon the top of the girders, P. A central plate, S′, extends between the two inner girders, P, as shown in Fig. 1, so that the only opening through the top of the kiln is between each pair of tracks.

The outer girders, P, in connection with plates T, extending down between the tracks to the inner line of the kiln at its top, form the inner sides of the chamber N, openings U through the outer ends of the girders P (see Fig. 3) allowing the free passage of the gases throughout the chamber N and between the two inner girders under the top plate, S′.

One or more stacks, V, of any usual construction extend up from the annular chamber N, and furnish a means of escape for the gases arising from the interior of the kiln, in the manner to be hereinafter described, and collecting in said chamber N.

One or more rows of flues or openings, W, which are shown in the drawings arranged in two rows, extend vertically through the wall around the upper part of the kiln, where it is of cone-like construction, so that the upper ends of said flues or openings W will open into the chamber N at its lower part, as shown in Fig. 3, and the lower ends, meeting the sloping surface of the interior of the kiln, of cone-like construction, will cause the ends W′ of the openings to extend a long distance through the roasting ore, as shown in Figs. 1 and 2, so that a greater surface of ore will be reached. The gas therefrom will pass through the openings W and into the chamber N and escape from there through the stacks V, the draft of which may be controlled in any well-known manner.

It is very desirable that the gases formed by the roasting of the ore should be immediately eliminated or removed from the interior of the kiln. The formation of these gases is continually going on in what is termed the "roasting-zone," in the upper part of the kiln; and if some means be employed for connecting the interior of the kiln at the roasting-zone, where the gases are formed, with the exterior of the kiln by flues or equivalent devices, so that the gases can be immediately eliminated or removed when formed, a much quicker oxidation and a more complete roasting of the ore will be effected. This is the object of the flues W, which are made to extend down so that their lower open ends will be within the roasting-zone of the kiln. The interior of the upper part of the shell A being conical and the flues W being vertical, as shown, their lower ends open for a considerable distance at the interior of the kiln at the roasting-zone, while their vertical direction and the conical shape of the shell at its top prevent them from being filled up or choked by the ore.

One purpose of the annular chamber N at the top of the kiln, and which communicates directly with the upper part of the interior of the kiln, is to draw off from the roasting ore the gases and cause them to be collected in said chamber and escape therefrom through stacks, the upper ends of which may extend up to a considerable height above the top of the kiln, thus greatly increasing the upward draft in the kiln, and at the same time carrying off the injurious gases into the air, so as not to interfere with the men working upon the top of the kiln attending to the dumping of the ore therein; and although there are large openings directly into the kiln, between the tracks, to allow of the introduction of ore, still, by reason of the manner of construction of the upper part of the kiln, the gases, instead of passing directly up through the openings between the tracks to interfere with the men working upon the top of the kiln, will pass into the chamber N and out of the stacks connected therewith.

The advantages of the manner of construction of my improved kiln for roasting ore will be readily appreciated by those skilled in the art to which my invention belongs.

The effect of the draft through the flues W, extending down into the roasting-zone, and the introduction of air by the long perforated tube K to the center of the mass of ore, causes an ample supply of atmospheric air to intermix with the roasting ore, and, as the sulphurous acid gas formed is carried off by the draft through the flues W into the chamber N and out of the stacks leading therefrom, more rapid and vivid combustion takes place, producing higher oxidation and yielding a more thoroughly roasted and increased product.

It will be understood that sulphurous acid gas stops combustion, and, as it is more than twice as heavy as air, if it is not removed on its formation by a strong draft it remains sluggishly circulating in the roasting-zone, retarding combustion and preventing oxidation and the elimination of injurious matter.

In starting up the roasting-kiln, fuel is introduced into the shell A and ignited, and then ore is introduced upon the top of the ignited fuel, and thereafter fuel and ore are introduced or charged together at the top of the kiln in such proportions as will continue combustion and carry on the roasting of the ore, all in the usual and well-known manners employed in roasting kilns or furnaces of this class now in general use.

I am aware that furnaces have heretofore been provided at their bases with central pyramidal or dome-shaped projections having horizontal and vertical openings for the admission of air to the centers of their bases, and I am also aware that furnaces with sloping boshes and conical upper portions have been provided with outlet-flues, and I do not therefore wish to be understood as claiming these features, broadly, my invention comprising certain new constructions and combinations, as hereinafter indicated by my claims, by which I am enabled to get a more perfect draft and thereby to eliminate the gases from the roasting-zone of the furnace more perfectly than in the furnaces heretofore constructed. Thus by my invention I am enabled to effect a quicker oxidation and a more perfect and complete roasting of the ore than heretofore.

Having thus described my improvements in kilns for roasting ore, what I claim therein as new and of my invention, and desire to secure by a patent, is—

1. In a kiln for roasting ores, the combination, with the base provided with the chamber I, and the vertical opening J, communicating therewith, of the cylinder or shell A, having the inwardly-sloping boshes C, the delivery-chutes H, the pyramid L, the sides L' of which communicate with the said chutes, the saddles M, projecting up between the inner ends of the said chutes, and the central pointed tube, K, communicating with the said opening J, and provided with holes as high up as the tops of the said boshes, substantially as set forth.

2. The combination, with the lower part of the kiln having the inwardly-sloping boshes C and the central perforated and pointed tube extending up as high as the tops of the said boshes, of the conical upper portion of the kiln, the inwardly-sloping walls of which are provided with vertical flues W, extending down into the roasting-zone of the kiln, the annular chamber N, into which the said flues open at their tops, and suitable stacks communicating with said chamber, substantially as set forth.

3. The combination, with a kiln having a conical upper portion, the inwardly-sloping walls of which are provided with vertical flues W, extending down into the roasting-zone of the kiln, of the annular chamber N, into which the said flues open at their tops, the girders P, the plates T between the said girders, the plates S, forming the top of the said chamber, and the stacks V, as set forth.

HOWARD H. BURDEN.

Witnesses:
FRED. W. SMITH,
JOHN C. DEWEY.